US011693213B2

(12) United States Patent
Weng et al.

(10) Patent No.: US 11,693,213 B2
(45) Date of Patent: Jul. 4, 2023

(54) OPTICAL SYSTEM

(71) Applicant: TDK TAIWAN CORP., Taoyuan (TW)

(72) Inventors: Chih-Wei Weng, Taoyuan (TW);
Chia-Pin Hsu, Taoyuan (TW);
Shao-Kuang Huang, Taoyuan (TW);
Kun-Shih Lin, Taoyuan (TW);
Shou-Jen Liu, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 14 days.

(21) Appl. No.: 17/399,641

(22) Filed: Aug. 11, 2021

(65) Prior Publication Data

US 2021/0382271 A1 Dec. 9, 2021

Related U.S. Application Data

(62) Division of application No. 16/044,254, filed on Jul. 24, 2018, now Pat. No. 11,119,294.
(Continued)

(30) Foreign Application Priority Data

Jun. 13, 2018 (CN) .......................... 201810607026.0

(51) Int. Cl.
*G02B 7/10* (2021.01)
*G02B 13/00* (2006.01)
(Continued)

(52) U.S. Cl.
CPC ......... *G02B 13/0015* (2013.01); *G02B 7/021* (2013.01); *G02B 7/10* (2013.01);
(Continued)

(58) Field of Classification Search
CPC ...... G02B 13/0015; G02B 7/10; G02B 7/021; G02B 7/102; G02B 9/04; G02B 9/62; G02B 13/0045
See application file for complete search history.

(56) References Cited

U.S. PATENT DOCUMENTS

2013/0287383 A1* 10/2013 Haruguchi ........... H04N 5/2257
396/144

FOREIGN PATENT DOCUMENTS

CN 1831980 A 9/2006

OTHER PUBLICATIONS

Office Action with Search Report dated Jan. 13, 2022 in corresponding CN Application 201810607026.0, 6 pages.

* cited by examiner

*Primary Examiner* — Joseph P Martinez
(74) *Attorney, Agent, or Firm* — Muncy, Geissler, Olds & Lowe, P.C.

(57) ABSTRACT

An optical system includes a fixed module, a movable module and a driving assembly. The movable module moves relative to the fixed module, and the movable module includes a lens unit which includes a first lens, a second lens, a first side wall and a second side wall. The first side wall has a first surface, which directly contacts the second lens, and the second side wall directly contacts the first lens. A portion of the driving assembly is directly disposed on the lens unit, configured to drive the lens unit to move along an optical axis of the first lens. The first side wall further has a second surface opposite to the first surface, and the second surface directly contacts the portion of the driving assembly. The thickness of the first side wall is different from the thickness of the second side wall.

20 Claims, 15 Drawing Sheets

Related U.S. Application Data

(60) Provisional application No. 62/532,117, filed on Jul. 13, 2017.

(51) Int. Cl.
*G02B 9/04* (2006.01)
*G02B 7/02* (2021.01)
*G02B 9/62* (2006.01)

(52) U.S. Cl.
CPC ............... *G02B 7/102* (2013.01); *G02B 9/04* (2013.01); *G02B 9/62* (2013.01); *G02B 13/0045* (2013.01)

OPTICAL SYSTEM

CROSS REFERENCE TO RELATED APPLICATIONS

This application a Divisional Application of U.S. patent application Ser. No. 16/044,254, filed on Jul. 24, 2018, which claims the benefit of U.S. Provisional Application No. 62/532,117, filed on Jul. 13, 2017, and China Patent Application No. 201810607026.0, filed on Jun. 13, 2018, the entirety of which are incorporated by reference herein.

BACKGROUND OF THE DISCLOSURE

Field of the Disclosure

The present disclosure relates to an optical system, and more particularly to an optical system that has an integrated lens unit.

Description of the Related Art

As technology has progressed, many kinds of electronic devices such as tablet computers and smartphones have begun to include the functionality of digital photography or video recording. A user can operate the electronic device to capture various images with an optical system (such as a camera module) that is included in the electronic device, and therefore electronic devices equipped with camera modules have gradually become popular.

Today's design of electronic devices continues to move toward the trend of miniaturization so that the various components of the camera module or its structure must also be continuously reduced, so as to achieve the purpose of miniaturization. In general, the camera module has a lens holder configured to hold a lens unit, and the lens unit accommodates a plurality of optical lenses. However, although the existing lens holder and lens units can achieve the aforementioned functions of photographing or video recording, they still cannot meet all the needs of miniaturization.

Therefore, how to design a miniaturized camera module is a topic nowadays that needs to be discussed and solved.

BRIEF SUMMARY OF THE DISCLOSURE

Accordingly, the present disclosure provides a miniaturized optical system installed in an electronic device to solve the above problems.

According to some embodiments of the disclosure, an optical system is provided and includes a fixed module, a movable module and a driving assembly. The movable module moves relative to the fixed module, and the movable module includes a lens unit. The lens unit includes a first lens, a second lens, a first side wall and a second side wall. The first side wall has a first surface, which is in direct contact with the second lens, and the second side wall is in direct contact with the first lens. A portion of the driving assembly is directly disposed on the lens unit, configured to drive the lens unit to move along an optical axis of the first lens. The first side wall further has a second surface, opposite to the first surface, and the second surface is in direct contact with the portion of the driving assembly. The thickness of the first side wall is different from the thickness of the second side wall.

According to some embodiments, the thickness of the first side wall is greater than the thickness of the second side wall. According to some embodiments, the second lens is partially exposed from the second side wall. According to some embodiments, the lens unit further includes an electrical connecting portion and a surface. The electrical connecting portion is disposed on the surface, and the surface faces a light incident end of the optical axis. According to some embodiments, the electrical connecting portion is disposed on the first side wall. According to some embodiments, the optical system further includes an elastic member, and the elastic member includes an electrical contact. The electrical connecting portion is electrically connected to the electrical contact, and a gap is formed between the electrical contact and the lens unit along the optical axis.

According to some embodiments, the electrical connecting portion includes a protruding portion extending along the optical axis, and the height of the protruding portion along the optical axis is greater than the gap. According to some embodiments, the elastic member further includes a narrow portion, and the narrow portion is adjacent to the electrical contact. According to some embodiments, the optical system further includes an elastic member disposed on the lens unit, and when viewed along the optical axis, the elastic member partially overlaps the second lens.

According to some embodiments, the optical system further includes a position-sensing assembly, the position-sensing assembly includes a magnetic sensing unit and a magnetic element, and the magnetic element is disposed on the second side wall.

According to some embodiments, the optical system further includes a circuit unit, the magnetic sensing unit is disposed on the circuit unit, and the circuit unit includes a first side surface and a second side surface respectively corresponding to the first side wall and the second side wall.

According to some embodiments, the magnetic sensing unit is disposed on the second side surface, and the circuit unit further includes an electrical pin disposed on the first side surface. According to some embodiments, the optical system further includes a frame, and the frame includes a recessed portion configured to receive a portion of the circuit unit. According to some embodiments, the frame further includes a lateral stop portion, and the lateral stop portion extends along a direction of the optical axis and corresponds to the second side wall.

According to some embodiments, the fixed module includes a base, the optical system further includes a plurality of metal members disposed in the base, and at least one metal member is electrically connected to the driving assembly. According to some embodiments, the base further includes a plurality of protruding columns that extends along a direction of the optical axis, at least one of the metal members is buried in a corresponding protruding column, and the metal member buried in the protruding column is partially exposed from the protruding column. According to some embodiments, the fixed module further includes a casing, and some of the metal members are securely connected to the casing.

According to some embodiments, the optical system further includes a frame and a circuit unit, and the circuit unit is disposed in the frame and electrically connected to the driving assembly.

According to some embodiments, the fixed module further includes a casing, the casing includes a first side and a second side, the first side is opposite to the second side, the first side and the second side are parallel to the optical axis, and the distance between the optical axis and the first side is not equal to the distance between the optical axis and the second side. According to some embodiments, the driving assembly is disposed between the first side and the first side wall, and the distance between the optical axis and the first side is greater than the distance between the optical axis and the second side. According to some embodiments, the optical system further includes a guiding assembly for guiding the lens unit to move along a first direction relative to the fixed module. When viewed along the direction of the optical axis, the guiding assembly partially overlaps the second lens.

The present disclosure provides an optical system that is installed in an electronic device and is configured to capture images. In various embodiments of the present disclosure, the optical system only has a lens unit configured to hold a plurality of lenses without additionally utilizing an optical member holder to hold the aforementioned lenses. Therefore, the overall size of the optical system can be reduced, so as to achieve the purpose of miniaturization. In addition, the lens unit holds the lenses with different sizes. For example, the uppermost portion of the lens unit (the light incident end) holds a smaller lens, so that other structures can be formed on the upper surface of the lens unit for connecting other members of the optical system (such as the first elastic member, the first coil and the second coil). Thus, the overall size of the optical system can be further reduced, so as to achieve the purpose of miniaturization.

Furthermore, in some embodiments of the present disclosure, the optical system can include a plurality of metal members which is formed in the base by the technology of Molded Interconnect Device, and a part of the metal members is exposed from the base to be electrically connected to the first elastic member and the driving assembly (such as the first coil and the second coil). In addition, the metal members that are not electrically connected to the first elastic member can enhance the structural strength of the base.

In addition, in another embodiment of the present disclosure, the optical system can include a guiding assembly (such as a plurality of balls) disposed between the lens unit and the protruding columns of the base, so that the lens unit can be guided by the guiding assembly to smoothly move along the direction of the optical axis relative to the base.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

DETAILED DESCRIPTION OF THE ILLUSTRATIVE EMBODIMENTS

Figure 1:
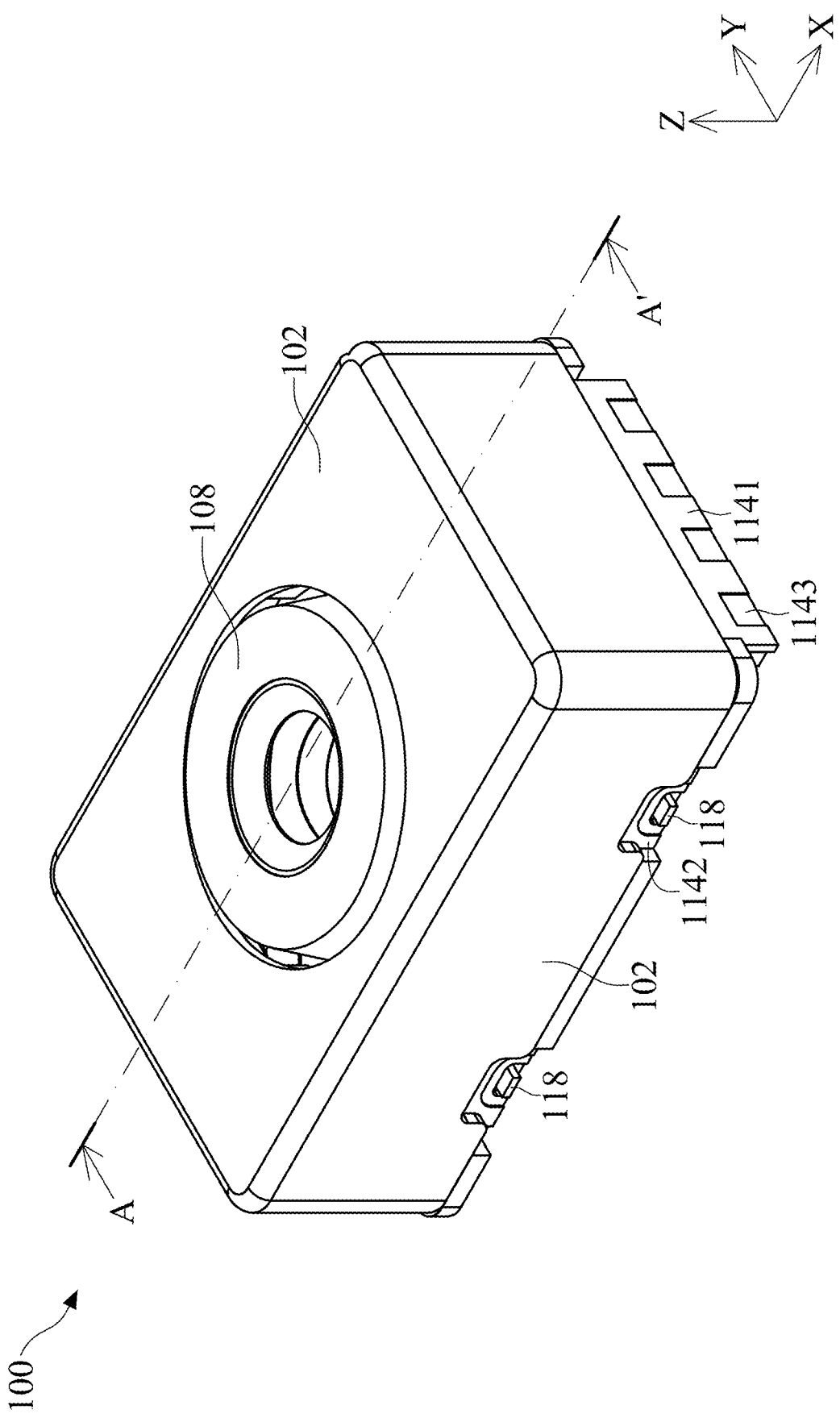
FIG. 1 shows a schematic diagram of an optical system according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
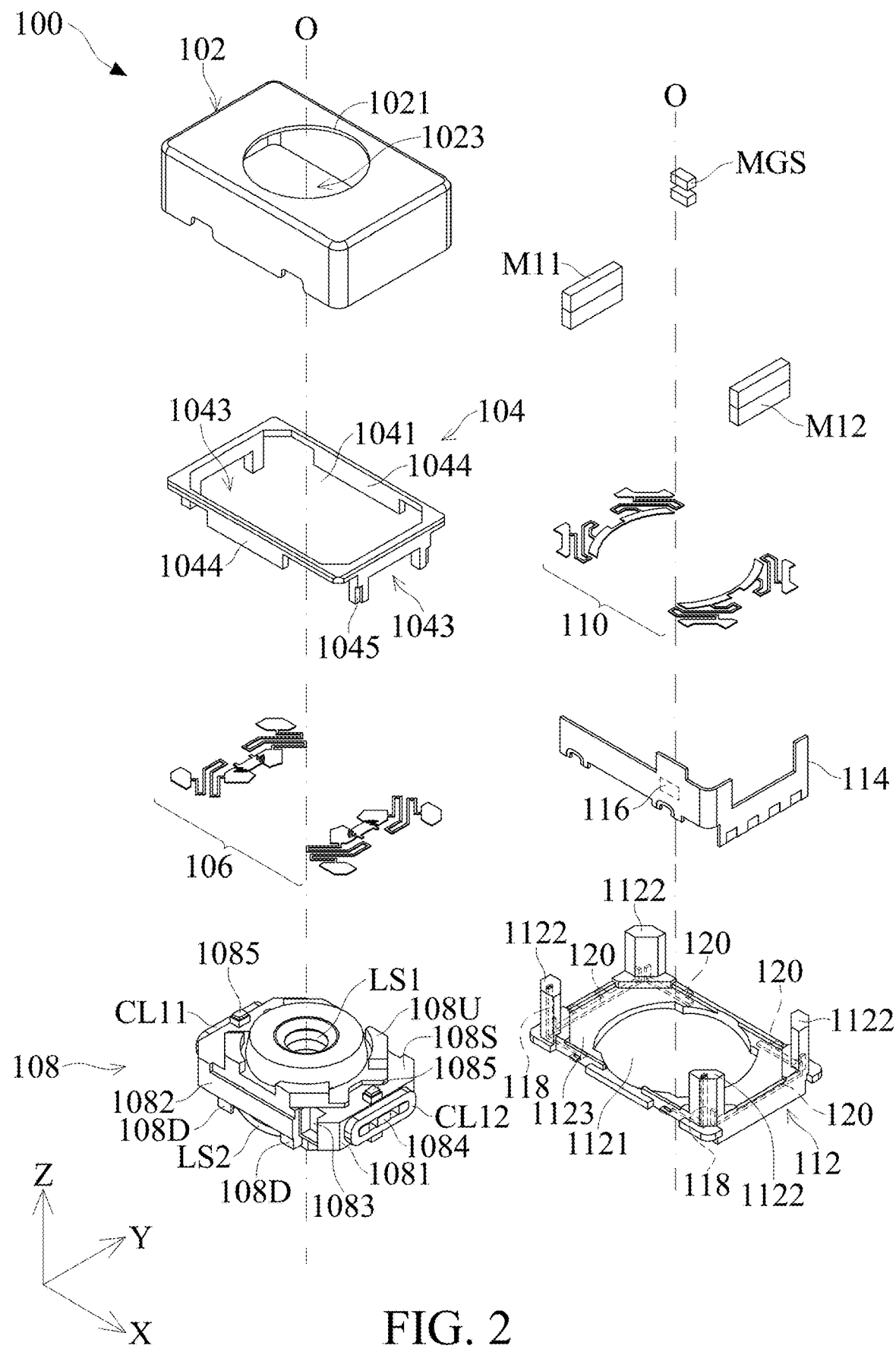
FIG. 2 shows an exploded diagram of the optical system in FIG. 1 according to the embodiment of the present disclosure.
Figure 3:
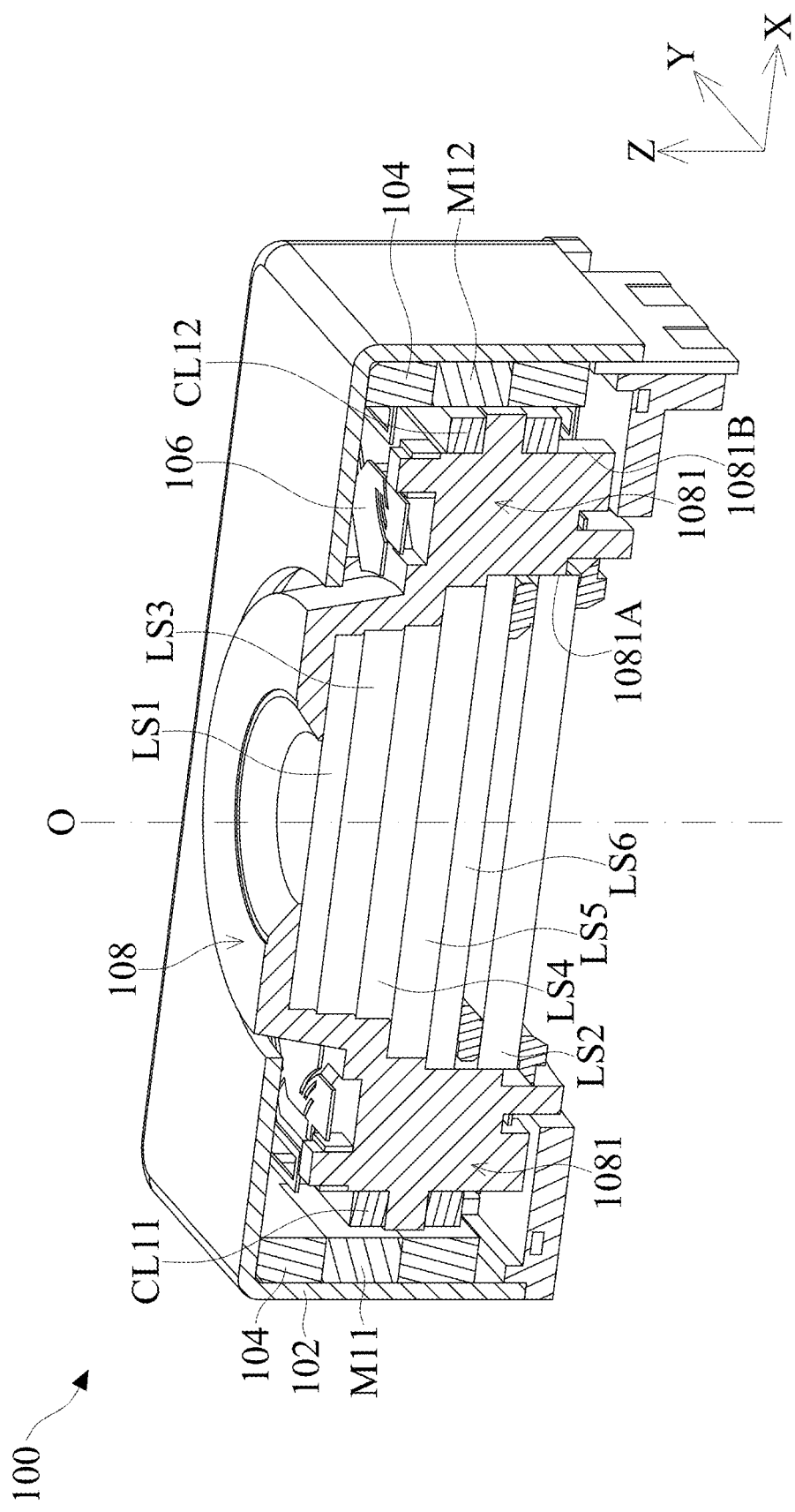
FIG. 3 shows a schematic cross-sectional view along line A-A' in FIG. 1 according to the embodiment of the present disclosure.

Please refer to FIG. 1 to FIG. 3. FIG. 1 shows a schematic diagram of an optical system 100 according to an embodiment of the present disclosure, FIG. 2 shows an exploded diagram of the optical system 100 according to the embodiment of the present disclosure, and FIG. 3 shows a schematic cross-sectional view along line A-A' in FIG. 1 according to the embodiment of the present disclosure. The optical system 100 can be an optical camera system and can be configured to hold and drive an optical member. The optical system 100 can be installed in different electronic devices or portable electronic devices, such as a smartphone or a tablet computer, for allowing a user to perform the image capturing function. In this embodiment, the optical system 100 can be a voice coil motor (VCM) with an auto-focusing (AF) function, but it is not limited thereto. In other embodiments, the optical system 100 can also perform the functions of auto-focusing and optical image stabilization (OIS).

As shown in FIG. 1 to FIG. 3, in the present embodiment, the optical system 100 mainly includes a casing 102, a frame 104, a first elastic member 106, a lens unit 108, and a first magnet M11, a second magnet M12, a first coil CL11, a second coil CL12, a second elastic member 110, a base 112, a circuit unit 114, a magnetic element MGS, and a magnetic sensing unit 116. In this embodiment, the casing 102, the frame 104, and the base 112 can be designed to collectively form a fixed module, and the lens unit 108 can be defined as a movable module that moves relative to the fixed module. In addition, it should be noted that in other embodiments, the members in the fixed module can also be adjusted to be movable (that is, they can be included in the movable module) according to practical requirements. For example, the frame 104 can be designed to be movable in other embodiments.

As shown in FIG. 2, the casing 102 has a hollow structure, and a casing opening 1021 is formed on the casing 102. A base opening 1121 is formed on the base 112. The center of the casing opening 1021 corresponds to an optical axis O of a plurality of lenses which are held by the lens unit 108. The base opening 1121 corresponds to an image sensing element (now shown in the figures) disposed below the base 112. External light can enter the casing 102 through the casing opening 1021, and then to be received by the image sensing element (not shown) after passing through the lenses and the base opening 1121, so as to generate a digital image signal.

In addition, the casing 102 can include an accommodating space 1023 for accommodating the frame 104, the lens unit 108, the first elastic member 106, the first magnet M11, the second magnet M12, the first coil CL11, the second coils CL12, the circuit unit 114, and so on. In this embodiment, the first magnet M11, the second magnet M12, the first coil CL11, and the second coil CL12 can be designed to collectively form a driving assembly. The driving assembly is electrically connected to the circuit unit 114 and can drive the lens unit 108 to move relative to the fixed module, for example, to move relative to the base 112.

As shown in FIG. 2 and FIG. 3, in this embodiment, the frame 104 includes an opening 1041 and two grooves 1043. The opening 1041 is configured to receive the lens unit 108, and the grooves 1043 are configured to respectively accommodate the first magnet M11 and the second magnet M12. However, the number of the grooves 1043 and magnets is not limited to this embodiment. In this embodiment, the shape of the first magnet M11 and the second magnet M12 can include a long-strip structure, but it is not limited thereto. For example, they can have different shapes in other embodiments. In addition, the first magnet M11 or the second magnet M12 can be a multi-pole magnet.

As shown in FIG. 2 and FIG. 3, the frame 104 is securely disposed on an inner wall surface of the casing 102, and the first magnet M11 and the second magnet M12 can also be securely disposed on the inner wall surface of the casing 102. As shown in FIG. 2 and FIG. 3, in this embodiment, the first coil CL11 and the second coil CL12 can be winding coils and are disposed on two opposite sides of the lens unit 108. In this embodiment, the first coil CL11 corresponds to the first magnet M11, and the second coil CL12 corresponds to the second magnet M12. When the first coil CL11 and the second coil CL12 are provided with electricity, the first coil CL11 and the second coil CL12 respectively act with the first magnet M11 and the second magnet M12 to generate an electromagnetic driving force, to drive the lens unit 108 and the lenses held thereby to move along a direction of the optical axis O (the Z-axis direction) relative to the base 112. In addition, it should be noted that, because the first coil CL11 and the second coil CL12 provided in the present disclosure are respectively disposed on opposite sides of the lens unit 108, the magnetic interference problem to other elements inside the optical system 100 can be reduced.

Figure 4:
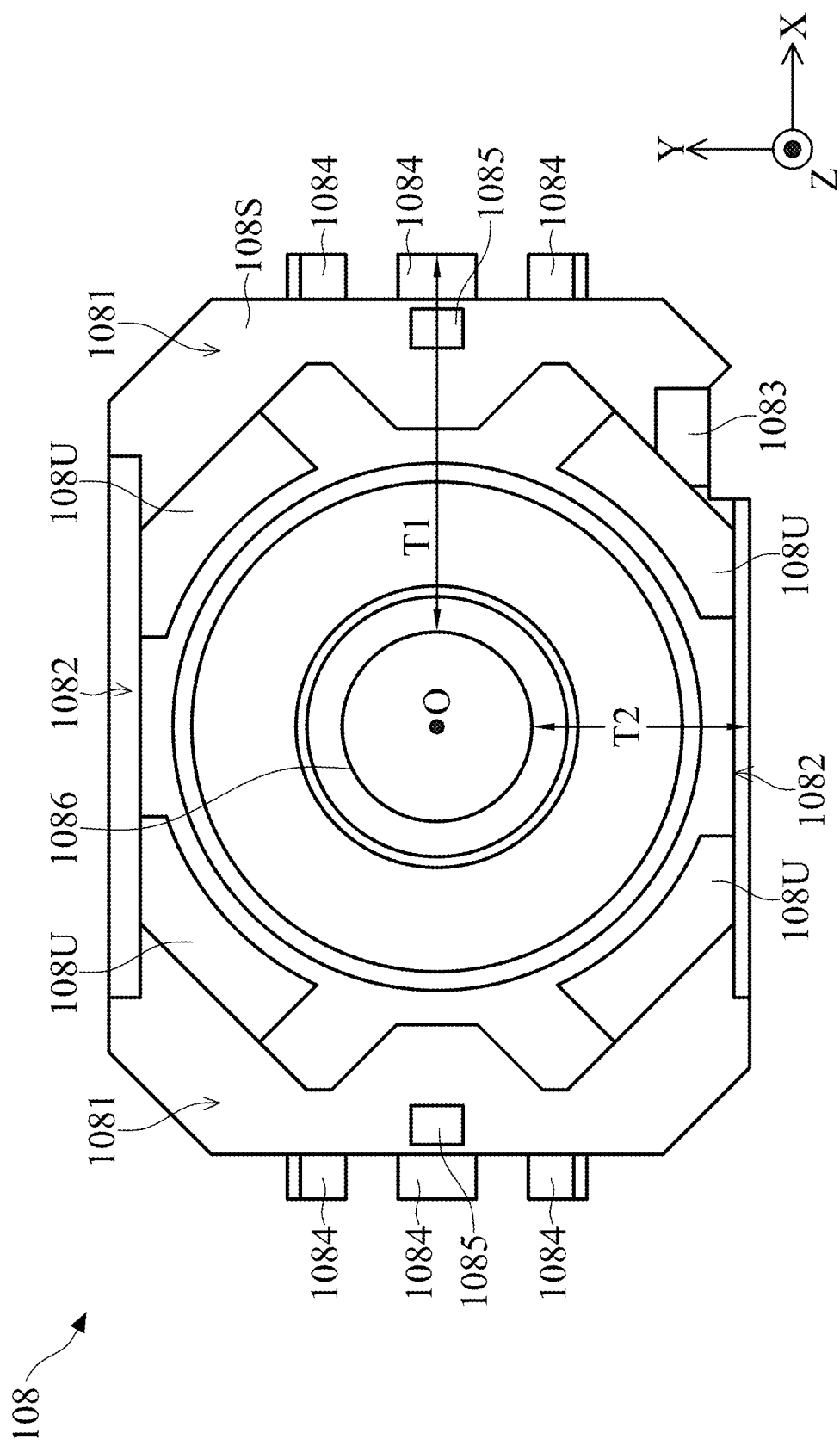
FIG. 4 is a top view of a lens unit according to an embodiment of the present disclosure.

Please refer to FIG. 2 and FIG. 4. FIG. 4 is a top view of a lens unit 108 according to an embodiment of the present disclosure. As shown in FIG. 4, the lens unit 108 includes an opening 1086, and the lens unit 108 can include two first side walls 1081 which are disposed opposite to each other and two second side walls 1082 which are disposed opposite to each other. In this embodiment, the first side wall 1081 has a thickness T1, and the thickness T1 can be defined as the distance between the edge of the opening 1086 of the lens unit 108 and the outermost edge of the first side wall 1081 (the first side wall 1081 can include a fixing protrusion 1084). In addition, the second side wall 1082 has a thickness T2, and the thickness T2 can be defined as the distance between the edge of the opening 1086 of the lens unit 108 and the outermost edge of the second side wall 1082. The thickness T1 is different from the thickness T2. For example, the thickness T1 is greater than the thickness T2. Based on the design that the first side wall 1081 and the second side wall 1082 have different thicknesses, the width of the lens unit 108 along the Y-axis direction can be reduced, so as to achieve the purpose of miniaturizing the optical system 100.

Furthermore, in this embodiment, the lens unit 108 is configured to hold one or more lenses. For example, as shown in FIG. 3, the lens unit 108 holds a first lens LS1, a second lens LS2, a third lens LS3, a fourth lens LS4, a fifth lens LS5 and a sixth lens. LS6, but the number of lenses held by the lens unit 108 is not limited to this embodiment. In this embodiment, the inner surfaces of the first side wall 1081 and the second side wall 1082 are in direct contact with the plurality of lenses. More specifically, as shown in FIG. 3, the first side wall 1081 includes a first surface 1081A and a second surface 1081B opposite to the first surface 1081A. The first surface 1081A is in direct contact with the first lens LS1 and the second lens LS2, and the second surface 1081B is in contact with the second coil CL12. It should be noted that only the first side wall 1081 located between the second lens LS2 and the second coil CL12. That is, the lens unit 108 in this disclosure does not need to additionally use an optical member holder to hold the aforementioned lenses, so that the overall size of lens unit 108 can be reduced. In addition, as shown in FIG. 2, because the thickness T2 of the second side wall 1082 is smaller, a portion of the second lens LS2 held by the lens unit 108 is exposed from the second side wall 1082.

Please refer to FIG. 2 to FIG. 4. As shown in FIG. 2 and FIG. 4, the lens unit 108 can further include a plurality of upper stoppers 108U and a plurality of lower stoppers 108D. In this embodiment, the lens unit 108 includes four upper stoppers 108U and four lower stoppers 108D. When the lens unit 108 is moved along the Z-axis direction, the upper stoppers 108U are in contact with the casing 102, to constrain the lens unit 108 in an upper limit position, and when the lens unit 108 is moved along the −Z-axis direction, the lower stoppers 108D are in contact with the base 112, to constrain the lens unit 108 in a lower limit position. It should be noted that the upper stoppers 108U and the lower stoppers 108D in this embodiment are symmetrically formed on the lens unit 108.

In addition, as shown in FIG. 2 and FIG. 4, the lens unit 108 further includes an accommodating slot 1083 configured to accommodate a magnetic element MGS. In addition, the lens unit 108 further includes a plurality of fixing protrusions 1084 disposed on two opposite first side walls 1081 of the lens unit 108 and extended along the X-axis direction, so that the first coil CL11 and the second coil CL12 can be wound on the corresponding fixing protrusion 1084. In addition, the lens unit 108 can further include two protruding portions 1085 disposed on the two first side walls 1081. More specifically, the protruding portion 1085 is disposed on a surface (an upper surface 108S) of the lens unit 108, and the upper surface 108S faces the light incident end of the optical axis O. In this embodiment, the protruding portion 1085 can be a protruding column which extends from the upper surface 108S along the direction of the optical axis O, and one end of the first coil CL11 and the second coil CL12 can be connected to the corresponding protruding portion 1085. In this embodiment, the end and the protruding portion 1085 can be defined to collectively form an electrical connecting portion. It should be noted that the protruding portion 1085 is not limited to the protruding column. In other embodiments, the protruding portion 1085 can also be a welding point, such as a metal welding point.

Figure 5:
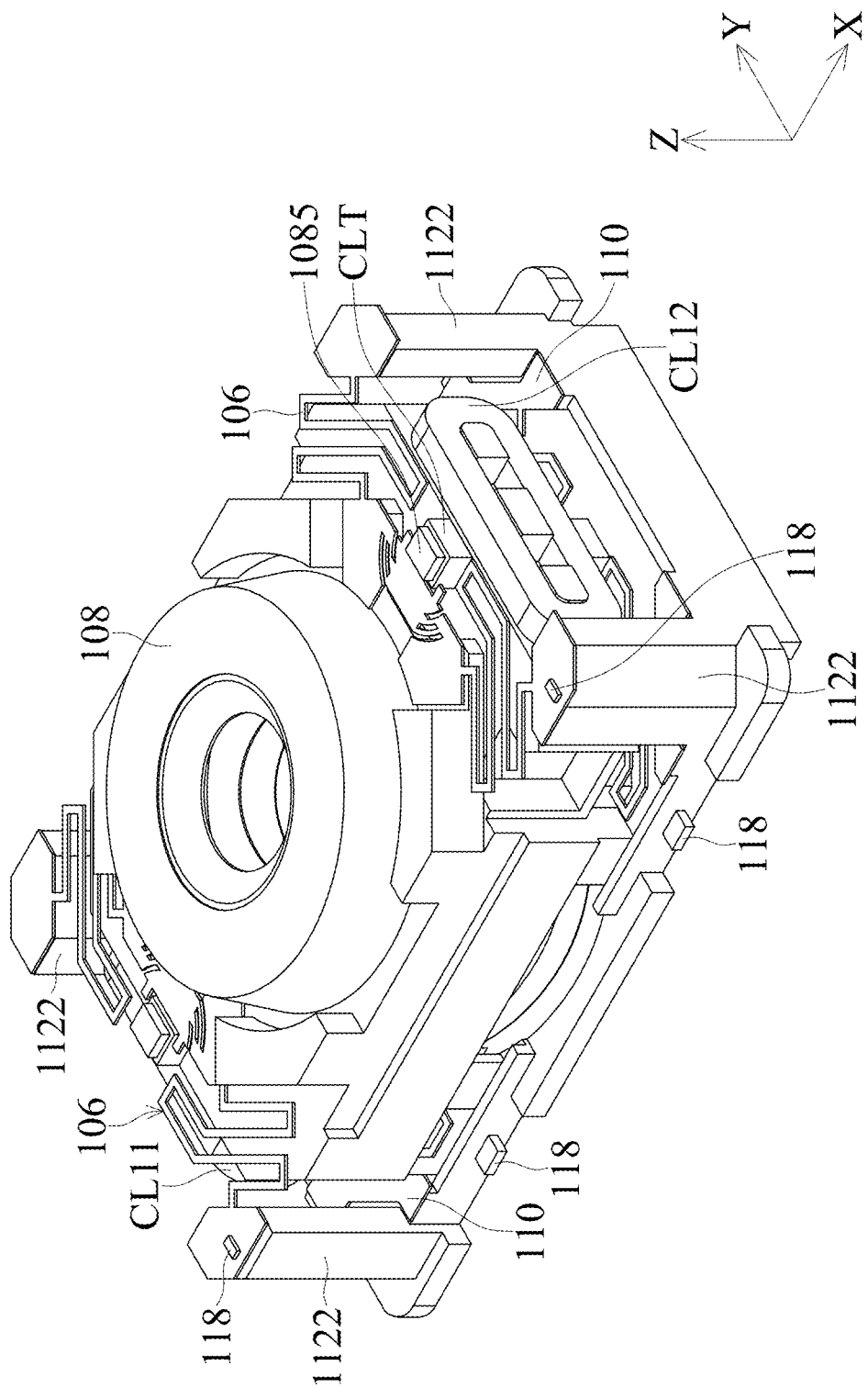
FIG. 5 is a partial structural diagram of the optical system according to the embodiment of the present disclosure.

Next, please refer to FIG. 2 and FIG. 5. FIG. 5 is a partial structural diagram of the optical system 100 according to the embodiment of the present disclosure. As shown in FIG. 2, the first elastic member 106 and the second elastic member 110 can be a metal sheet. In this embodiment, the first elastic member 106 can have two separate spring sheet portions, and the second elastic member 110 can also have two separate spring sheet portions. It should be noted that the number of the spring sheet portions of the first elastic member 106 and the second elastic member 110 is not limited to this embodiment.

In addition, as shown in FIG. 2 and FIG. 5, four protruding columns 1122 and an accommodating groove 1123 are formed on the base 112. The protruding columns 1122 extend along the direction of the optical axis O. As shown in FIG. 5, the outer portion of the first elastic member 106 is affixed on the four protruding columns 1122. Similarly, the outer portion of the second elastic member 110 is affixed on the accommodating groove 1123. In addition, the inner portions of the first elastic member 106 and the second elastic member 110 are respectively connected to the upper side and the lower side of the lens unit 108 so that the lens unit 108 can be suspended in the base 112 (as shown in FIG. 5).

Please refer to FIG. 2 and FIG. 5. As shown in FIG. 2, the optical system 100 can include a plurality of metal members disposed in the base 112. For example, the base 112 is made of a plastic material, and the metal member is formed in the base 112 by the technology of Molded Interconnect Device (MID). Specifically, in this embodiment, the optical system 100 includes two metal members 118 and three metal members 120, but the number of metal members is not limited to this embodiment. As shown in FIG. 5, the metal members 118 is buried in the protruding column 1122, and a portion of the metal member 118 is exposed from the corresponding protruding column 1122. As shown in FIG. 5, the portion of the metal member 118 which is exposed from the protruding column 1122 is directly connected to the first elastic member 106. In addition, as shown in FIG. 2, the metal members 120 are embedded in the base 112, and a portion of the metal member 120 is exposed from the base 112. It should be noted that the overall structural strength of the base 112 can be further enhanced by placing the metal members 120 in the base 112.

Figure 6:
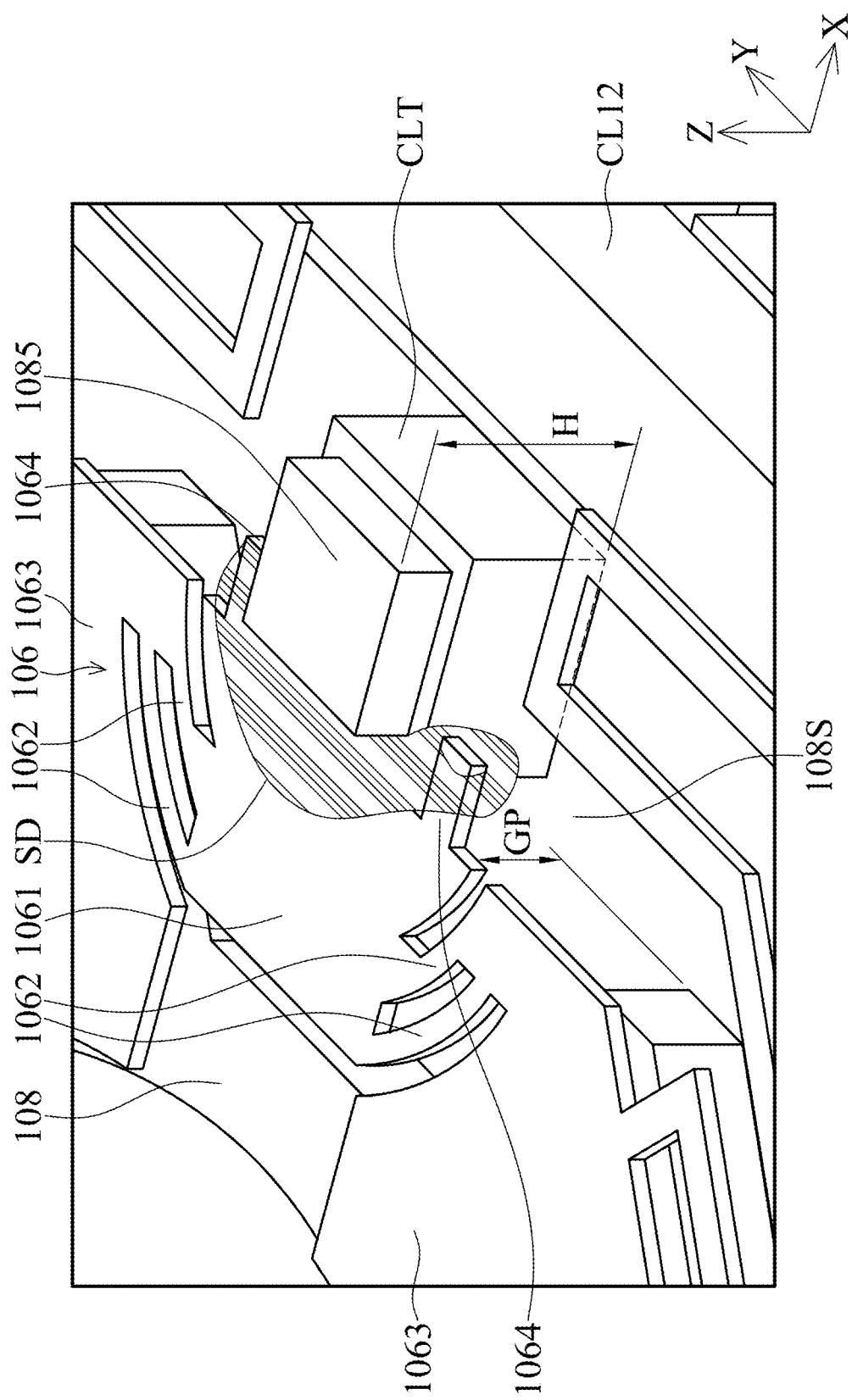
FIG. 6 is a partial enlarged diagram of FIG. 5 according to the embodiment of the present disclosure.

Please refer to FIG. 5 and FIG. 6. FIG. 6 is a partial enlarged diagram of FIG. 5 according to the embodiment of the present disclosure. As shown in FIG. 6, the inner portion of the first elastic member 106 has an electrical contact 1061, four narrow portions 1062, two connecting portions 1063, and two protruding portions 1064. The narrow portions 1062 are adjacent to the electrical contact 1061, and the electrical contact 1061 is connected to the two connecting portions 1063 by the four narrow portions 1062. In addition, the protruding portions 1064 are connected to the electrical contact 1061, and the electrical contact 1061 and the protruding portions 1064 are adjacent to the protruding portion 1085. In this embodiment, a terminal CLT of the second coil CL12 is wound on the protruding portion 1085, and the electrical contact 1061 and the protruding portions 1064 can be connected to the terminal CLT via a solder SD. That is, the terminal CLT on the protruding portion 1085 is electrically connected to the electrical contact 1061 and the protruding portions 1064 of the first elastic member 106. Thus, the second coil CL12 of the driving assembly can be further electrically connected to the metal member 118 described above by the first elastic member 106.

It should be noted that a gap GP is formed between the electrical contact 1061 and the upper surface 108S of the lens unit 108 along the direction of the optical axis O (the Z-axis direction), and the protruding portion 1085 has a height H along the direction of the optical axis O (the Z-axis direction). In this embodiment, the height H of the protruding portion 1085 is greater than the gap GP. Based on the structural design of the first elastic member 106 in this embodiment, many advantages can be achieved. For example, the electrical contact 1061 and the protruding portions 1064 are adjacent to the terminal CLT, so the area of soldering can be increased (when the solder SD is heated and melted, the solder SD can be attached to the upper surface and the lower surface of the electrical contact 1061 and can be attached to the protruding portions 1064 and the terminal CLT). Moreover, because the electrical contact 1061 are not in direct contact with the upper surface 108S of the lens unit 108, the high temperature generated by the soldering does not destroy the structure of the lens unit 108 when the electrical contact 1061 is soldered to the terminal CLT. In addition, because the electrical contact 1061 is connected to the connecting portions 1063 by the narrow portions 1062, the temperature is not easily conducted to the connecting portions 1063 when soldering the electrical contact 1061, and the structure of the lens unit 108 below the connecting portions 1063 can also be prevented from being damaged.

Figure 7:
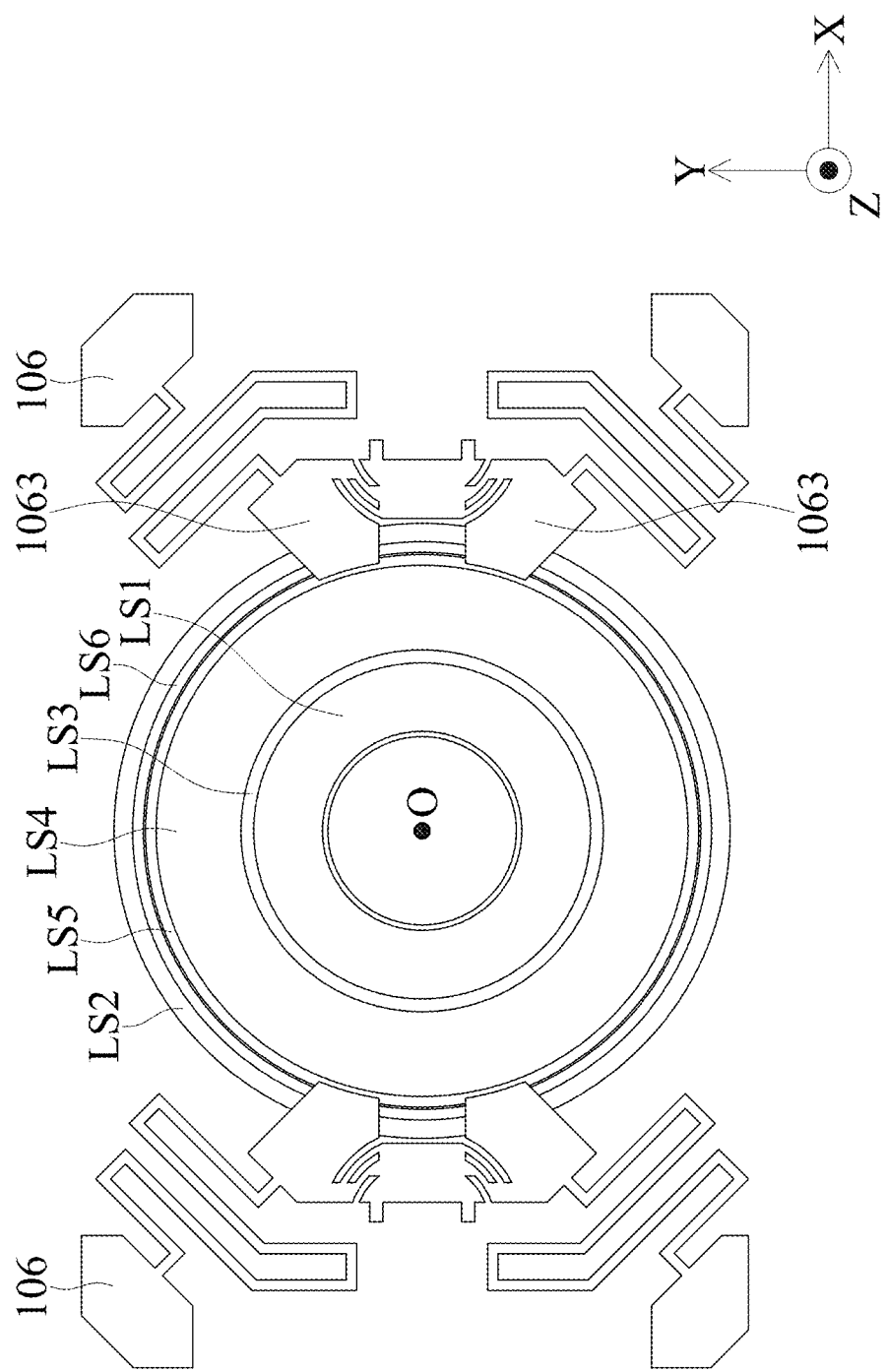
FIG. 7 shows a top view of a first elastic member and the lenses according to an embodiment of the present disclosure.

Please refer to FIG. 7, which shows a top view of the first elastic member 106 and the lenses according to an embodiment of the present disclosure. As shown in FIG. 7, when viewed along the direction of the optical axis O of the first lens LS1, the first elastic member 106 partially overlaps with the second lens LS2. Specifically, the connecting portions 1063 of the first elastic member 106 partially overlap the second lens LS2 and the fifth lens LS5.

Figure 8:
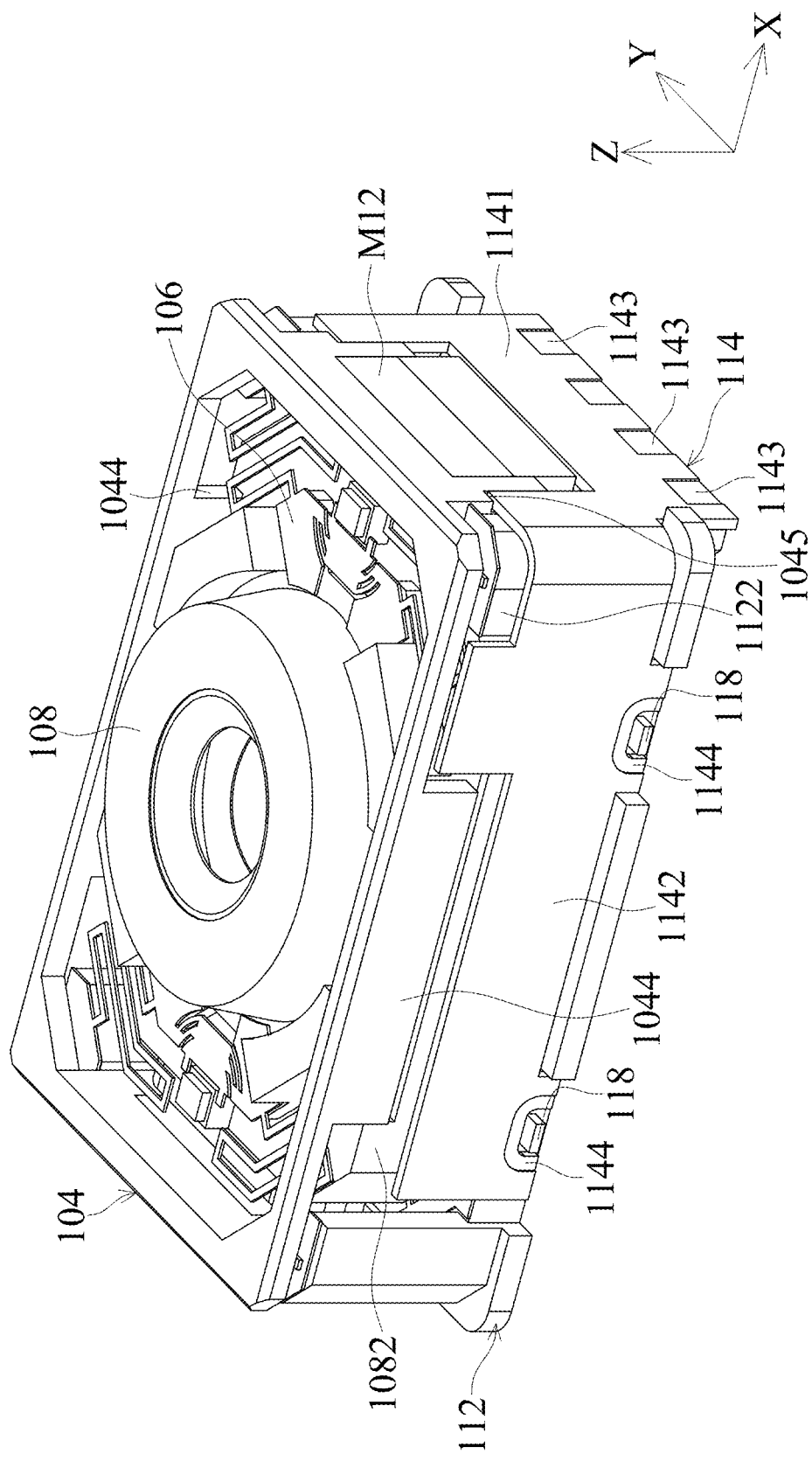
FIG. 8 shows a schematic diagram of the optical system after removing the casing according to the embodiment of the present disclosure.

Please refer to FIG. 2 and FIG. 8. FIG. 8 shows a schematic diagram of the optical system 100 after removing the casing 102 according to the embodiment of the present disclosure. As shown in the figures, the frame 104 further includes two lateral stop portions 1044 that extend along the direction of the optical axis O, and the lateral stop portion 1044 faces the second side wall 1082. In this embodiment, the lateral stop portions 1044 can constrain the movement of the lens unit 108 along the Y-axis direction so as to prevent the lens unit 108 from colliding with other members in the optical system 100 when the lens unit 108 is shaken.

In this embodiment, the circuit unit 114 is a flexible printed circuit board, and the circuit unit 114 can be bent around the protruding columns 1122 as shown in FIG. 8. After the circuit unit 114 is bent, the circuit unit 114 includes a first side surface 1141 and a second side surface 1142, and the first side surface 1141 and the second side surface 1142 respectively face the first side wall 1081 and the second side wall 1082 (the first side wall 1081 is not shown in FIG. 8 due to the viewing angle). Furthermore, as shown in FIG. 8, the frame 104 can further include a recessed portion 1045 for receiving a portion of the first side surface 1141 of the circuit unit 114. It should be noted that, in this embodiment, when the portion of the first side surface 1141 of the circuit unit 114 is accommodated in the recessed portion 1045, the first side surface 1141 is substantially coplanar with the frame 104 along the X-axis direction. In addition, in this embodiment, the circuit unit 114 can include four electrical pins 1143 disposed on the first side surface 1141 so that the optical system 100 can be electrically connected to an external circuit through the electrical pins 1143.

In addition, as shown in FIG. 8, the circuit unit 114 can further include two electrical contacts 1144, and the ends of the two metal members 118 which are exposed from the base 112 are adjacent to the electrical contacts 1144 of the circuit unit 114. Therefore, the ends of the two metal members 118 can be connected to the electrical contacts 1144 by soldering so that the metal members 118 are electrically connected to the circuit unit 114. Thus, the first coil CL11 (or the second coil CL12) can be electrically connected to the circuit unit 114 through the first elastic member 106 and the metal members 118 in sequence.

Figure 9:
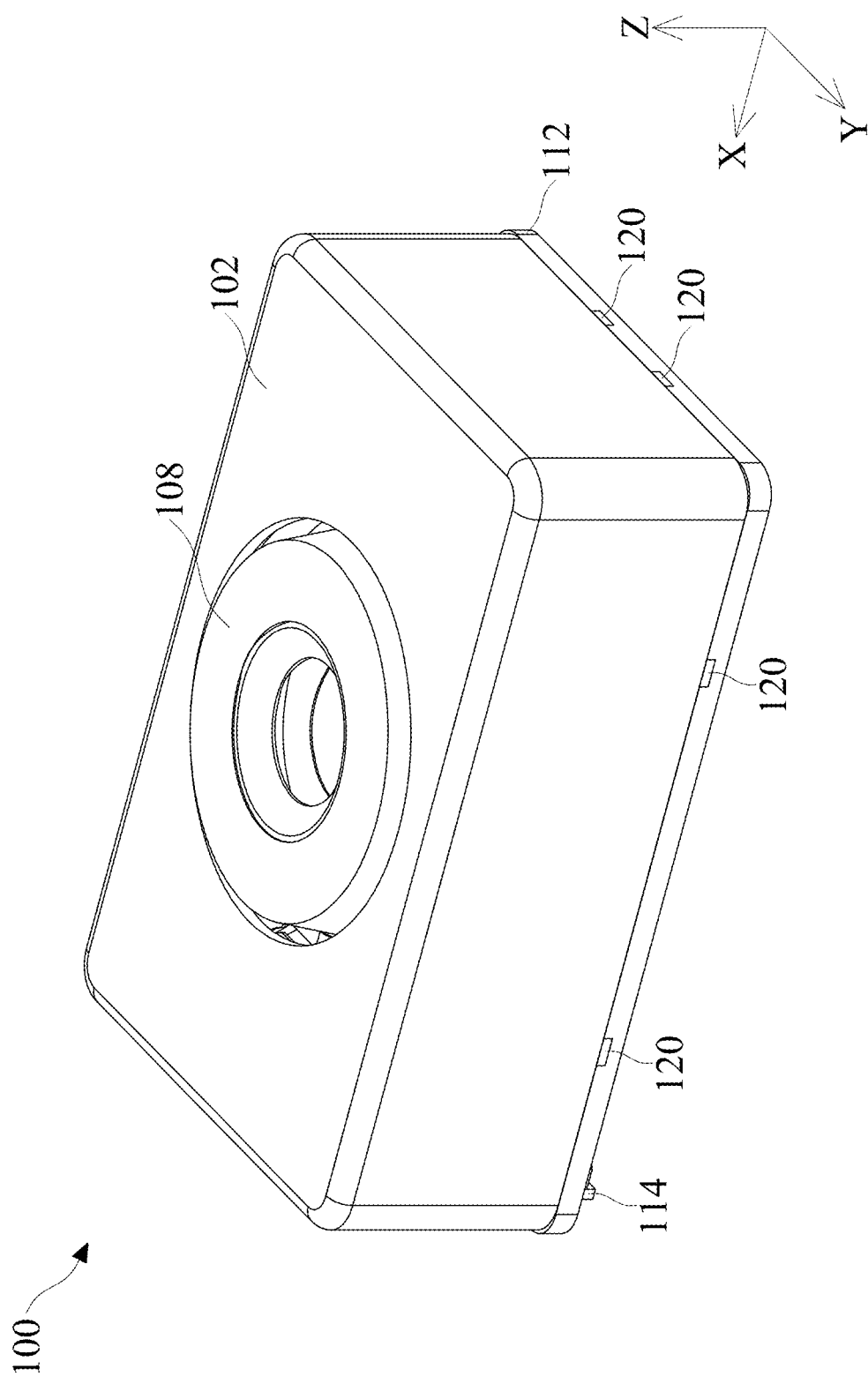
FIG. 9 shows a schematic diagram of the optical system in another view according to the embodiment of the present disclosure.

Furthermore, please refer to FIG. 9, which shows a schematic diagram of the optical system 100 in another view according to the embodiment of the present disclosure. As shown in FIG. 9, when the casing 102 covers the base 112, the exposed ends of the metal members 120 can also be securely connected to the casing 102 by soldering so that the casing 102 can be more securely connected to the casing 102. Therefore, the casing 112 does not easily separate from the base 112.

Figure 10:
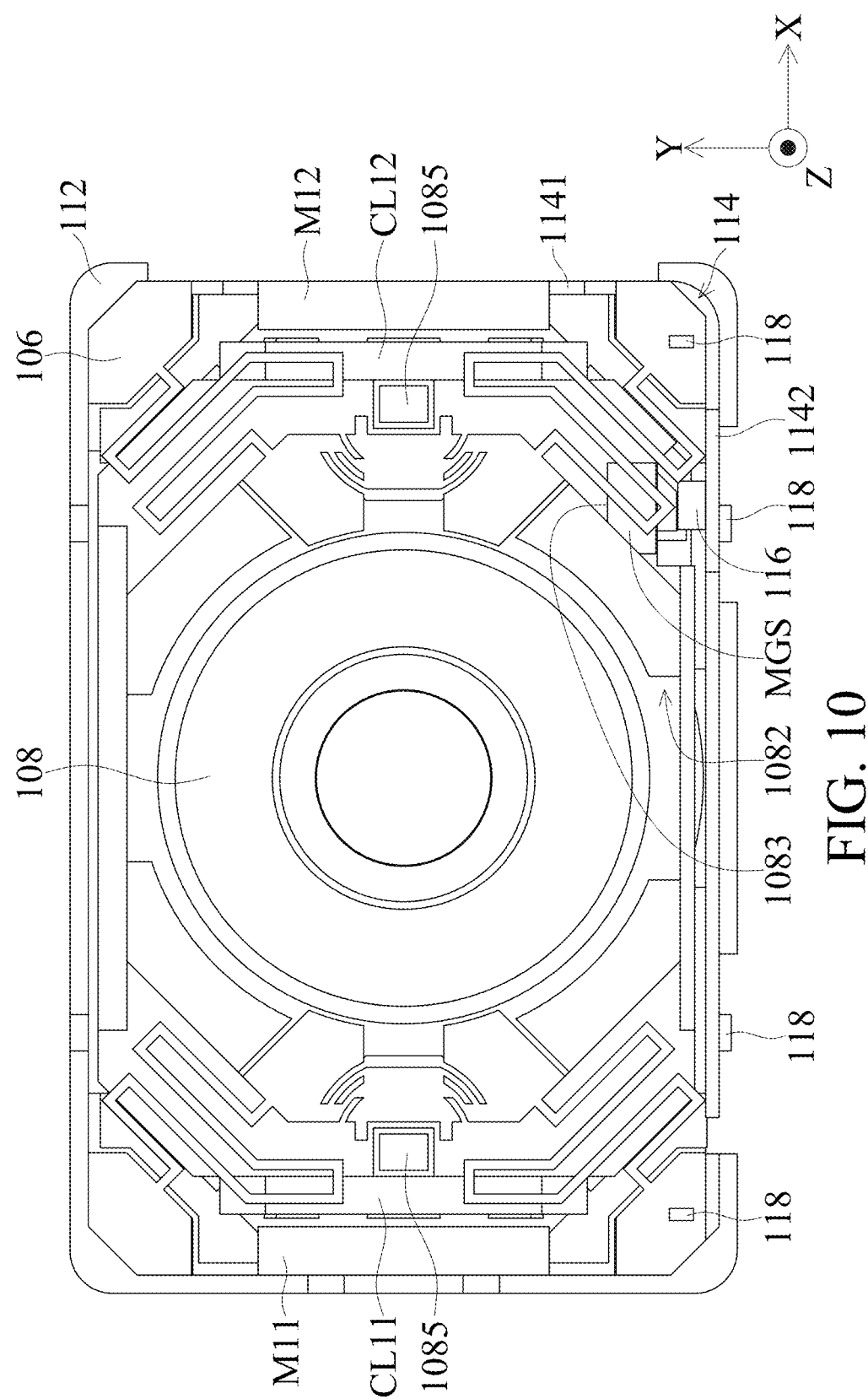
FIG. 10 shows a top view of the optical system after removing the casing and the frame according to the embodiment of the present disclosure.

Referring to FIG. 10, which shows a top view of the optical system 100 after removing the casing 102 and the frame 104 according to the embodiment of the present disclosure. In this embodiment, the magnetic element MGS and the magnetic sensing unit 116 in the optical system 100 can be defined to collectively form a position-sensing assembly, and the magnetic sensing unit 116 senses the movement of the magnetic element MGS relative to the magnetic sensing unit 116 according to variation of the magnetic field of the magnetic element MGS. In this embodiment, the magnetic element MGS is disposed in the accommodating slot 1083 on the second side wall 1082, and the magnetic sensing unit 116 is disposed on the second side surface 1142 of the circuit unit 114. Because the position-sensing assembly (the magnetic sensing unit 116 and the magnetic element MGS) and the driving assembly (such as the first magnet M11 or the second magnet M12) are disposed on different sides of the lens unit 108, the magnetic interference between the driving assembly and the position-sensing assembly can be reduced.

Figure 11:
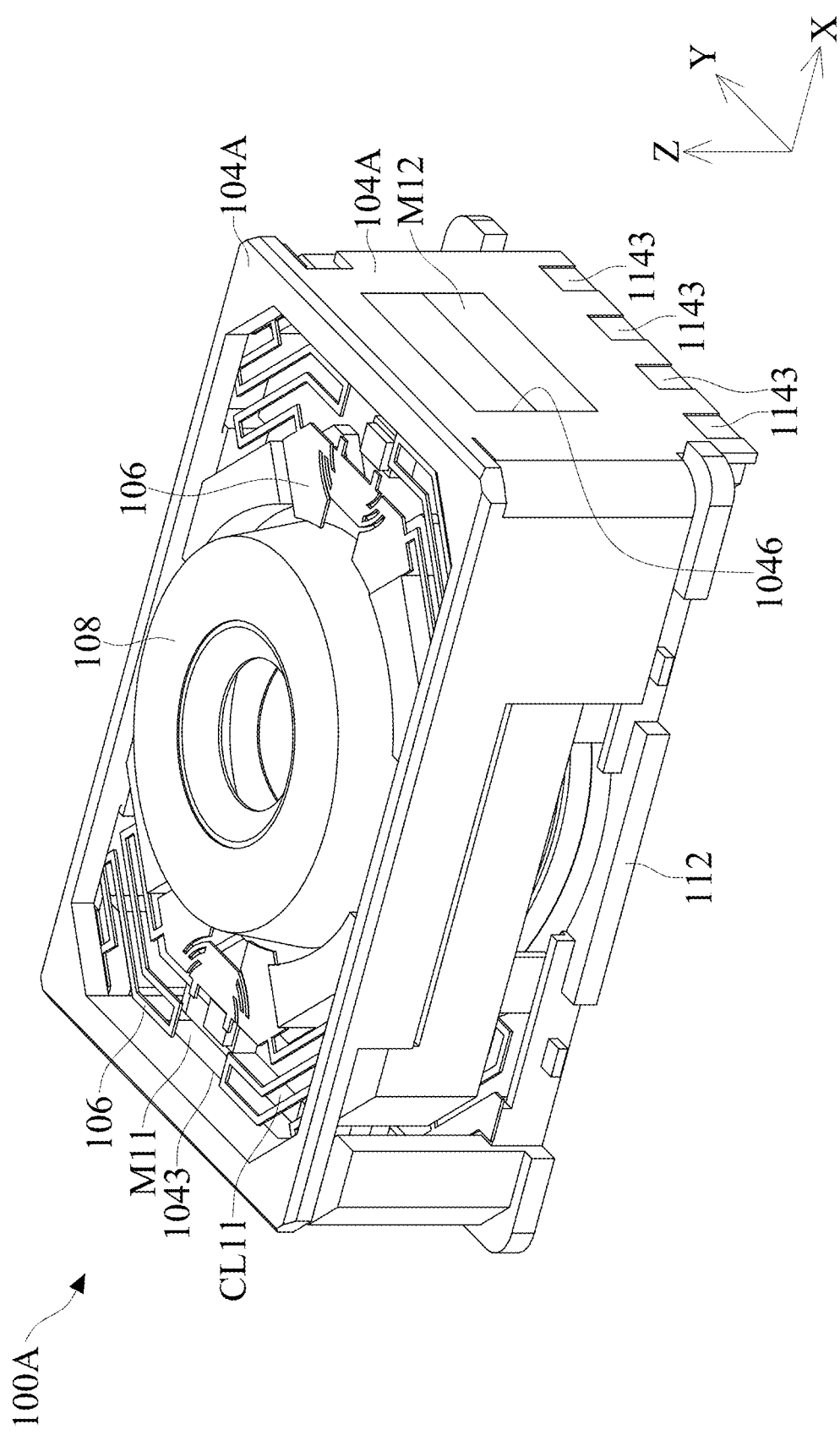
FIG. 11 shows a schematic diagram of an optical system after removing a casing according to another embodiment of the present disclosure.
Figure 12:
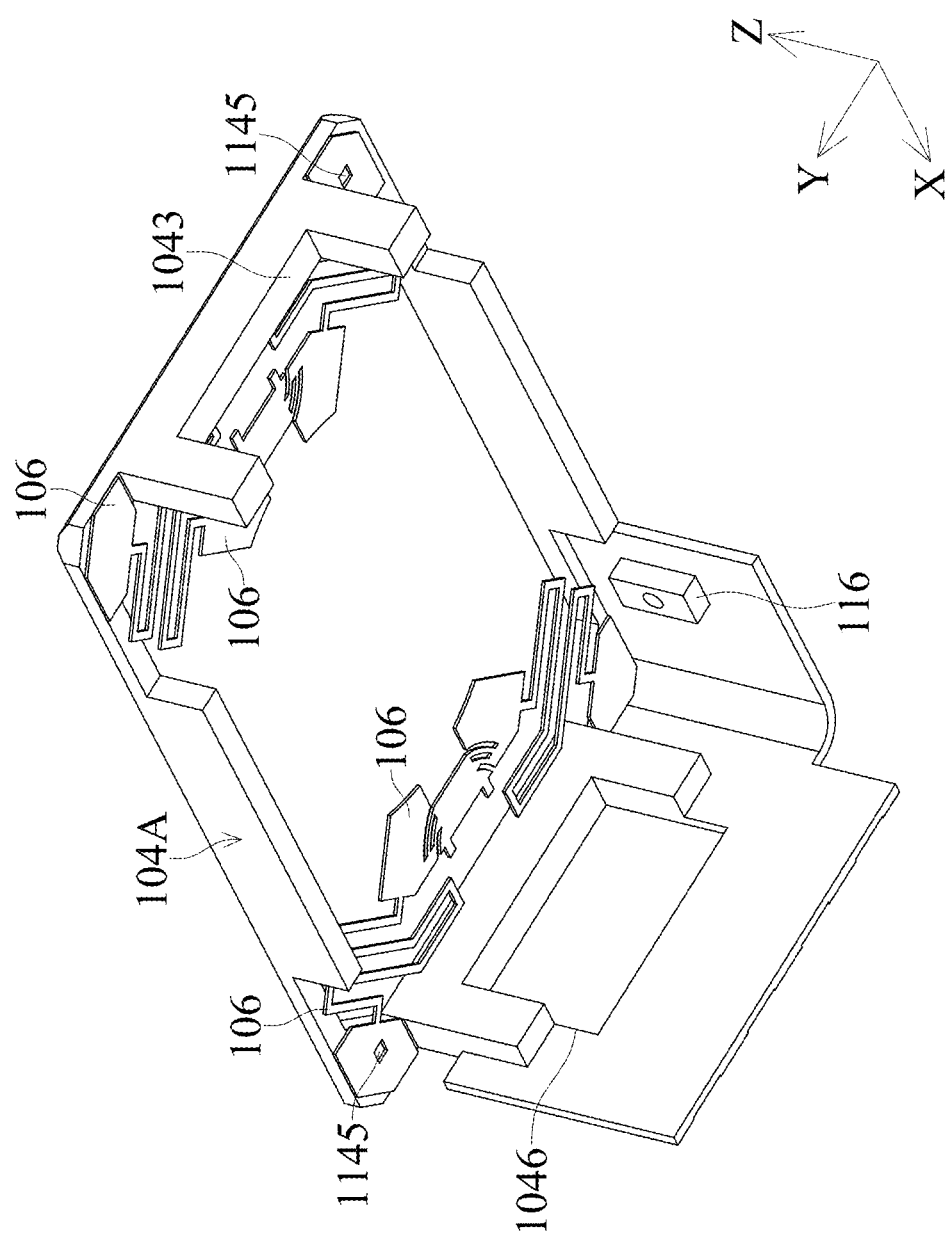
FIG. 12 shows a partial structural diagram of the optical system in FIG. 11 according to the embodiment of the present disclosure.

Please refer to FIG. 11 and FIG. 12. FIG. 11 shows a schematic diagram of an optical system 100A after removing a casing according to another embodiment of the present disclosure, and FIG. 12 shows a partial structural diagram of the optical system 100A in FIG. 11 according to the embodiment of the present disclosure. The optical system 100A is similar to the optical system 100 described above, and the difference between the two embodiments is that the circuit unit in the optical system 100A is disposed in a frame 104A. That is, as shown in FIG. 11, the circuit unit is integrated in the frame 104A. For example, the wires in the circuit unit are formed in the frame 104A by using the technology of Molded Interconnect Device (MID). Similarly, in this embodiment, the frame 104A also exposes the plurality of electrical pins 1143 of the circuit unit, and the electrical pins 1143 are configured to be electrically connected to an external circuit, such as being electrically connected to a main board of a portable electronic device.

In addition, the frame 104A has the groove 1043 mentioned above on one side and a notch 1046 on the opposite side. The groove 1043 and the notch 1046 respectively accommodate the first magnet M11 and the second magnet M12. In addition, please refer to FIG. 12. FIG. 12 only shows the frame 104A and the first elastic member 106. As shown in FIG. 12, two electrical contacts 1145 of the circuit unit can be formed on the frame 104A, and the two electrical contacts 1145 are respectively located at two corners of the frame 104A. The two electrical contacts 1145 are configured to be electrically connected to the two spring sheet portions of the first elastic member 106. In addition, another electrical contact (not shown in the figure) can also be formed on the frame 104A, so that the magnetic sensing unit 116 is electrically connected to this electrical contact. It should be noted that the wires of the circuit unit in this embodiment can also be directly formed on the inner surface of the frame 104A.

Similar to the optical system 100 of the previous embodiment, because the two spring sheet portions of the first elastic member 106 are respectively welded to the terminals of the first coil CL11 and the second coil CL12 (not shown in FIG. 11 due to the viewing angle), the first coil CL11 and the second coil CL12 are also electrically connected to the circuit units in the frame 104A via the electrical contacts 1145. Thus, the first coil CL11 and the second coil CL12 can be driven by the circuit unit in the frame 104A.

Figure 13:
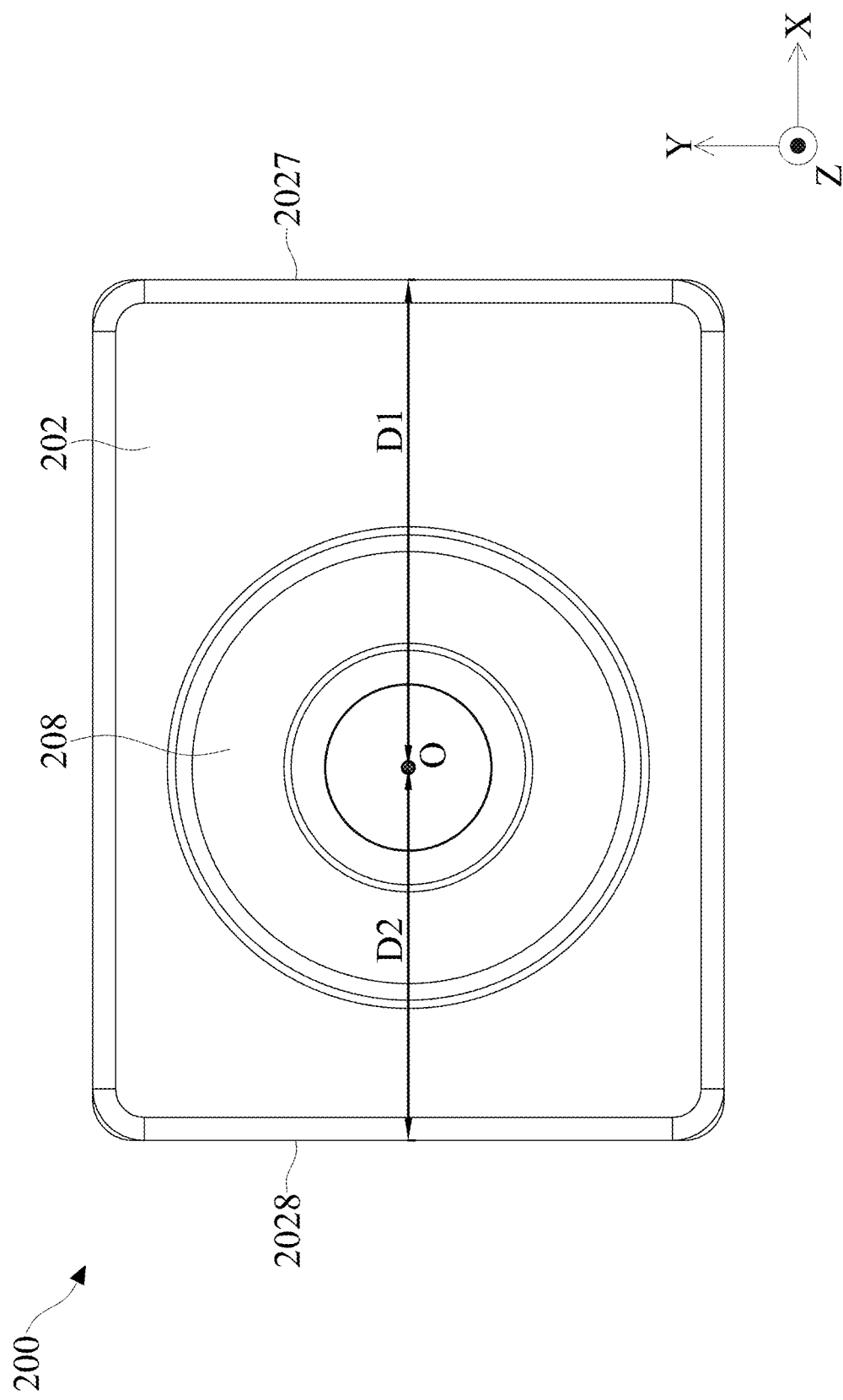
FIG. 13 shows a top view of an optical system according to another embodiment of the present disclosure.
Figure 14:
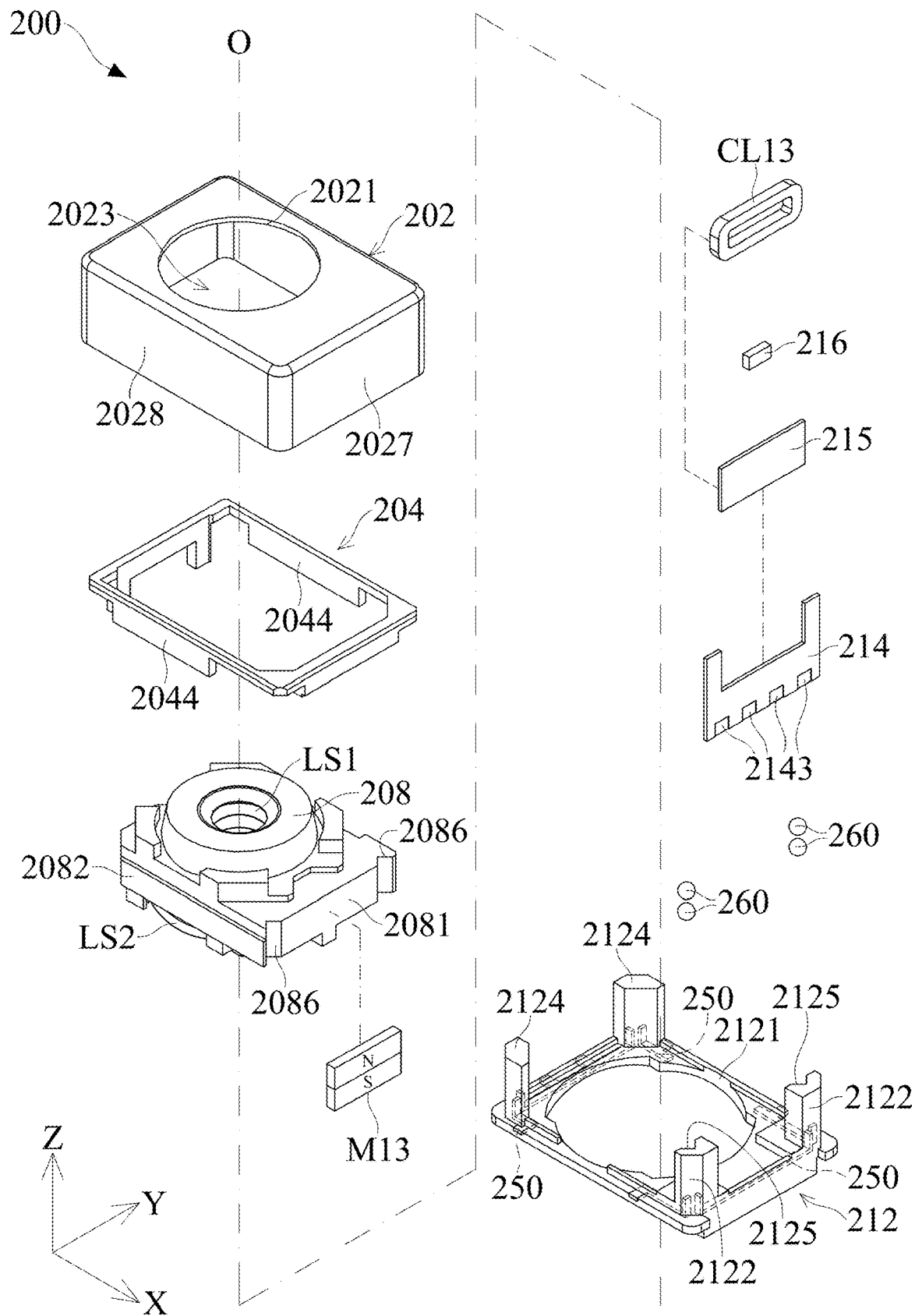
FIG. 14 shows an exploded diagram of the optical system according to the embodiment of the present disclosure.
Figure 15:
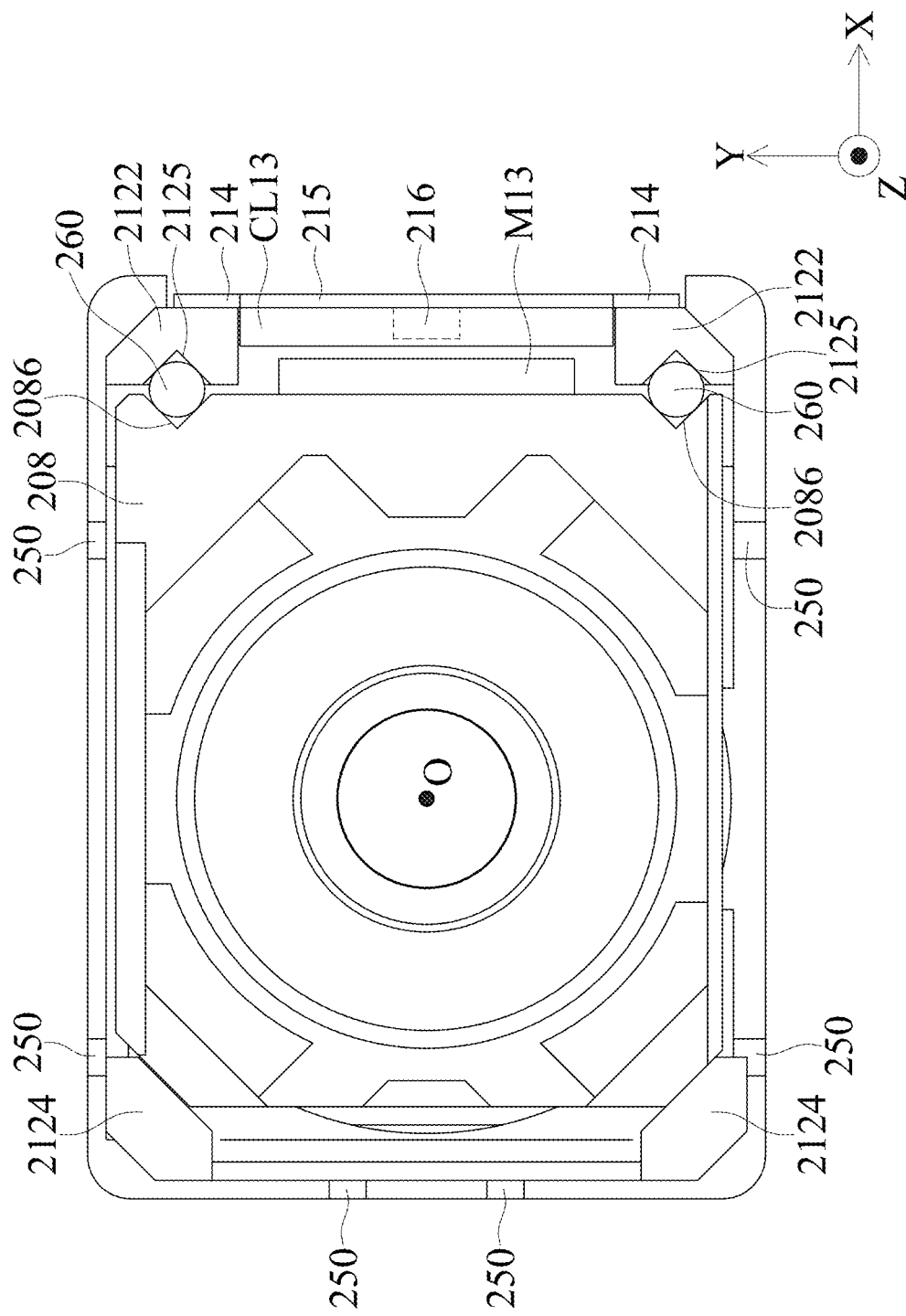
FIG. 15 shows a top view of a partial structure of the optical system according to the embodiment of the present disclosure.

Please refer to FIG. 13 to FIG. 15. FIG. 13 shows a top view of an optical system 200 according to another embodiment of the present disclosure, FIG. 14 shows an exploded diagram of the optical system 200 according to the embodiment of the present disclosure, and FIG. 15 shows a top view of a partial structure of the optical system 200 according to the embodiment of the present disclosure. In this embodiment, as shown in FIG. 13 and FIG. 14, the optical system 200 includes a casing 202, a frame 204, a lens unit 208, a magnet M13, a coil CL13, a base 212, a circuit unit 214, a plate body 215, a magnetic sensing unit 216 and a guiding assembly. In this embodiment, the casing 202 can be combined with the base 212 as a fixed module, and the lens unit 208 can be defined as a movable module that moves relative to the fixed module.

Similar to the casing 102 of the previous embodiment, the casing 202 includes a casing opening 2021 and an accommodating space 2023. In addition, in this embodiment, the casing 202 further includes a first side 2027 and a second side 2028 opposite to the first side 2027, and the first side 2027 and the second side 2028 are parallel to the optical axis O. In addition, the distance between the optical axis O and the first side 2027 is not equal to the distance between the optical axis O and the second side 2028.

In this embodiment, the frame 204 is securely disposed on the inner wall surface of the casing 202. That is, the frame 204 can also be included in the fixed module. In addition, similar to the previous embodiments, the frame 204 can also have two lateral stop portions 2044 configured to constrain the movement of the lens unit 208 along the Y-axis direction.

As shown in FIG. 14, similar to the previous embodiment, the lens unit 208 is configured to hold multiple lenses, such as the first lens LS1 and the second lens LS2. In this embodiment, the lens unit 208 includes a first side wall 2081 and a second side wall 2082 respectively corresponding to the first side 2027 and the second side 2028, and the magnet M13 is securely disposed on the first side wall 2081. In addition, in this embodiment, the base 212 has two protruding columns 2122 and two protruding columns 2124, and the protruding columns 2122 and the protruding columns 2124 extend along the direction of the optical axis O. Similar to the previous embodiment, the optical system 200 can include a plurality of metal members 250 disposed in the base 212. For example, the base 212 is made of a plastic material, and the metal members 250 are formed in the base 212 by the technology of Molded Interconnect Device (MID).

In this embodiment, the plate body 215 can be a magnetic conductive plate, the coil CL13 and the magnetic sensing unit 216 are disposed on the plate body 215, and the coil CL13 surrounds the magnetic sensing unit 216. As shown in FIG. 14 and FIG. 15, the plate body 215 is securely connected to the circuit unit 214, and the circuit unit 214 is securely disposed between the two protruding columns 2122. The circuit unit 214 can be a flexible printed circuit board and has four electrical pins 2143 configured to be electrically connected to an external circuit. As shown in FIG. 15, when the circuit unit 214 supplies electricity to the coil CL13, the coil CL13 can act with the magnet M13 to generate an electromagnetic driving force, to drive the lens unit 208 and the lenses to move along a first direction relative to the base 212. In this embodiment, the first direction can be the direction of the optical axis O (the Z-axis direction).

In this embodiment, the driving assembly defined by the magnet M13 and the coil CL13 is disposed between the first side 2027 of the casing 202 and the first side wall 2081 of the lens unit 208, and there is no driving assembly provided between the second side 2028 and the second side walls 2082. Therefore, the width of the optical system 200 along the Y-axis direction can be further reduced, so as to achieve the purpose of miniaturization.

In addition, it should be noted that, as shown in FIG. 14 and FIG. 15, a guiding slot 2125 can be formed on each protruding column 2122, and two grooves 2086 can be correspondingly formed on the first side wall 2081 of the lens unit 208. In this embodiment, the guiding assembly can include four rolling members 260, such as balls, and the rolling member 260 is received between the guiding slot 2125 and the groove 2086 so that the lens unit 208 can smoothly move along the optical axis O relative to the base 212. In this embodiment, the rolling members 260 are disposed between two adjacent corners of the lens unit 208 and the base 212, but they are not limited thereto. For example, in other embodiments, the rolling members 260 can also be disposed between four corners of the lens unit 208 and the base 212 so that the lens unit 208 can move more smoothly relative to the base 212.

In other embodiments, the guiding slots 2125 can also be formed on the frame 204 so that the rolling members 260 are disposed between the guiding slots 2125 on the frame 204 and the grooves 2086. Therefore, when viewed along the direction of the optical axis O, the rolling members 260 can partially overlap the second lens LS2, which means that the structural design of the lens unit 208 of the present embodiment can further reduce the length of the optical system 200 along the X-axis direction. Specifically, as shown in FIG. 13, there is a distance D1 formed between the optical axis O and the first side 2027, an another distance D2 is formed between the optical axis O and the second side 2028, and the distance D1 is greater than the distance D2. Therefore, the size of the optical system 200 along the X-axis direction can be reduced, so as to achieve the purpose of miniaturization.

In conclusion, the present disclosure provides an optical system that is installed in an electronic device and is configured to capture images. In various embodiments of the present disclosure, the optical system only has a lens unit configured to hold a plurality of lenses without additionally utilizing an optical member holder to hold the aforementioned lenses. Therefore, the overall size of the optical system can be reduced, so as to achieve the purpose of miniaturization. In addition, the lens unit holds the lenses with different sizes. For example, the uppermost portion of the lens unit (the light incident end) holds a smaller lens, so that other structures can be formed on the upper surface of the lens unit for connecting other members of the optical system (such as the first elastic member 106, the first coil CL11, and the second coil CL12). Thus, the overall size of the optical system can be further reduced, so as to achieve the purpose of miniaturization.

Furthermore, in some embodiments of the present disclosure, the optical system can include a plurality of metal members which is formed in the base by the technology of Molded Interconnect Device, and a part of the metal members is exposed from the base to be electrically connected to the first elastic member 106 and the driving assembly (such as the first coil CL11 and the second coil CL12). In addition, the metal members that are not electrically connected to the first elastic member 106 can enhance the structural strength of the base.

In addition, in another embodiment of the present disclosure, the optical system can include a guiding assembly (such as a plurality of balls) disposed between the lens unit and the protruding columns of the base, so that the lens unit can be guided by the guiding assembly to smoothly move along the direction of the optical axis O relative to the base.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
a fixed module;
a movable module, movable relative to the fixed module, the movable module comprising a lens unit, and the lens unit comprising:
a first lens;
a second lens;
a first side wall, comprising a first surface, wherein the first surface is in direct contact with the second lens; and
a second side wall, being in direct contact with the first lens; and
a driving assembly, a portion of the driving assembly being directly disposed on the lens unit, configured to drive the lens unit to move along an optical axis of the first lens;
wherein the first side wall further comprises a second surface opposite to the first surface, the second surface is in direct contact with the portion of the driving assembly, and a thickness of the first side wall is different from a thickness of the second side wall;
wherein the length of the second side wall along the optical axis is less than the length of first side wall along the optical axis so that the second lens is partially exposed from the second side wall.

2. The optical system as claimed in claim 1, wherein the thickness of the first side wall is greater than the thickness of the second side wall.

3. The optical system as claimed in claim 1, wherein the optical system further comprises a guiding assembly for guiding the lens unit to move along a first direction relative to the fixed module, wherein when viewed along a direction of the optical axis, the guiding assembly is disposed on the first side wall.

4. The optical system as claimed in claim 3, wherein the fixed module includes a casing and a base, the casing is connected to the base and forms an accommodating space for accommodating the movable module, the driving assembly and the guiding assembly.

5. The optical system as claimed in claim 4, wherein the casing includes a first side and a second side opposite to the first side, the first side and the second side are parallel to the optical axis, and a distance between the optical axis and the first side is not equal to a distance between the optical axis and the second side.

6. The optical system as claimed in claim 5, wherein the driving assembly is disposed between the first side and the first side wall, and the distance between the optical axis and the first side is greater than the distance between the optical axis and the second side.

7. The optical system as claimed in claim 5, wherein the first side wall corresponds to the first side of the casing, and the driving assembly includes a magnet which is securely disposed on the first side wall.

8. The optical system as claimed in claim 5, wherein there is no driving element of the driving assembly disposed between the second side wall and the casing along a second direction perpendicular to the first direction.

9. The optical system as claimed in claim 4, wherein the fixed module further includes a frame securely disposed on an inner wall surface of the casing, and the frame has two lateral stop portions configured to constrain movement of the lens unit along a second direction, wherein the second direction is perpendicular to the first direction.

10. The optical system as claimed in claim 9, wherein a guiding slot is formed the frame, and a groove is correspondingly formed on the first side wall of the lens unit, wherein the guiding assembly is received between the guiding slot and the groove.

11. The optical system as claimed in claim 10, wherein the guiding assembly includes a rolling member received between the guiding slot and the groove, and when viewed the optical axis, the rolling member partially overlaps the second lens.

12. The optical system as claimed in claim 4, wherein the base further includes two protruding columns that extend along the optical axis, two guiding slots are respectively formed on the two protruding columns, and two grooves are correspondingly formed on the first side wall of the lens unit, wherein the guiding assembly is received between the guiding slots and the grooves.

13. The optical system as claimed in claim 12, wherein the guiding assembly includes at least two rolling members respectively disposed between the two guiding slots and the two grooves, and the at least two rolling members are disposed at two adjacent corners of the lens unit and the base.

14. The optical system as claimed in claim 13, wherein the driving assembly includes a magnet which is securely disposed on the first side wall, and when viewed along the optical axis, the magnet is disposed between the at least two rolling members.

15. The optical system as claimed in claim 14, wherein when viewed in a second direction perpendicular to the first direction, the magnet partially overlaps the rolling members.

16. The optical system as claimed in claim 15, wherein the driving assembly further includes a coil corresponding to the magnet, the coil is disposed between the two protruding columns, and when viewed in the second direction, the coil completely overlaps the protruding columns.

17. The optical system as claimed in claim 15, wherein when viewed in the second direction, the magnet partially overlaps the protruding columns.

18. The optical system as claimed in claim 4, wherein the base further includes four protruding columns that extend along the optical axis, four guiding slots are respectively formed on the four protruding columns, and four grooves are correspondingly formed on the lens unit, wherein the guiding assembly is received between the guiding slots and the grooves.

19. The optical system as claimed in claim 18, wherein the guiding assembly includes at least four rolling members respectively disposed between the four guiding slots and the four grooves, and the at least four rolling members are disposed at four corners of the lens unit and the base.

20. An optical system, comprising:
a fixed module;
a movable module, movable relative to the fixed module, the movable module comprising a lens unit, and the lens unit comprising:
a first lens;
a second lens;
a first side wall, comprising a first surface, wherein the first surface is in direct contact with the second lens; and
a second side wall, being in direct contact with the first lens; and a driving assembly, a portion of the driving assembly being directly disposed on the lens unit, configured to drive the lens unit to move along an optical axis of the first lens;

wherein the first side wall further comprises a second surface opposite to the first surface, the second surface is in direct contact with the portion of the driving assembly, and a thickness of the first side wall is different from a thickness of the second side wall;

wherein the optical system further comprises a guiding assembly for guiding the lens unit to move along a first direction relative to the fixed module, wherein when viewed along a direction of the optical axis, the guiding assembly is disposed on the first side wall.

* * * * *